Sept. 15, 1931. B. W. McGINNIS 1,823,157
FLANGE LUBRICATOR
Filed Jan. 27, 1928  2 Sheets—Sheet 2
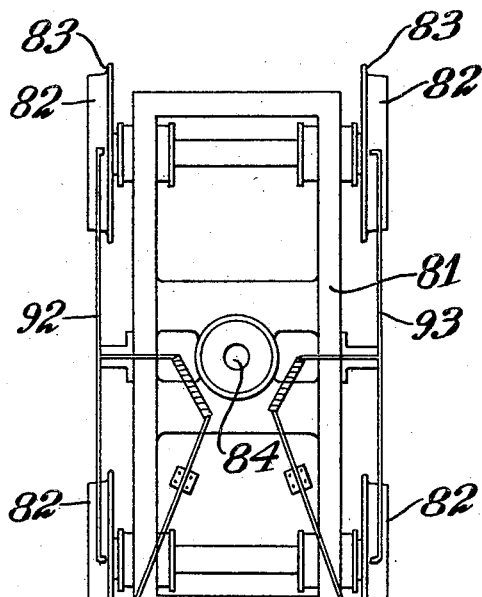
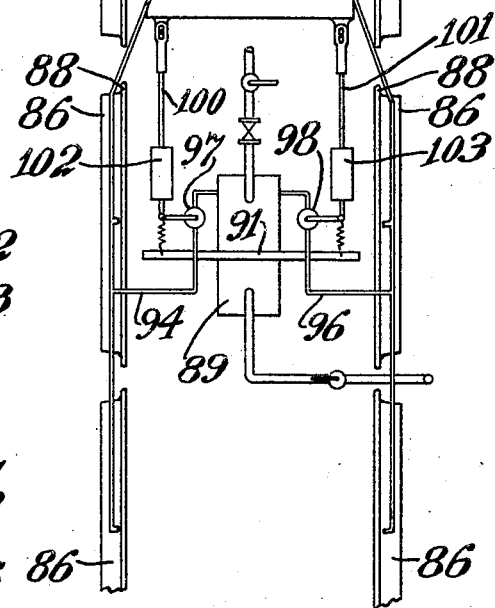
Inventor
B. W. McGinnis
By Johnston & Jennings
Attorney Patented Sept. 15, 1931

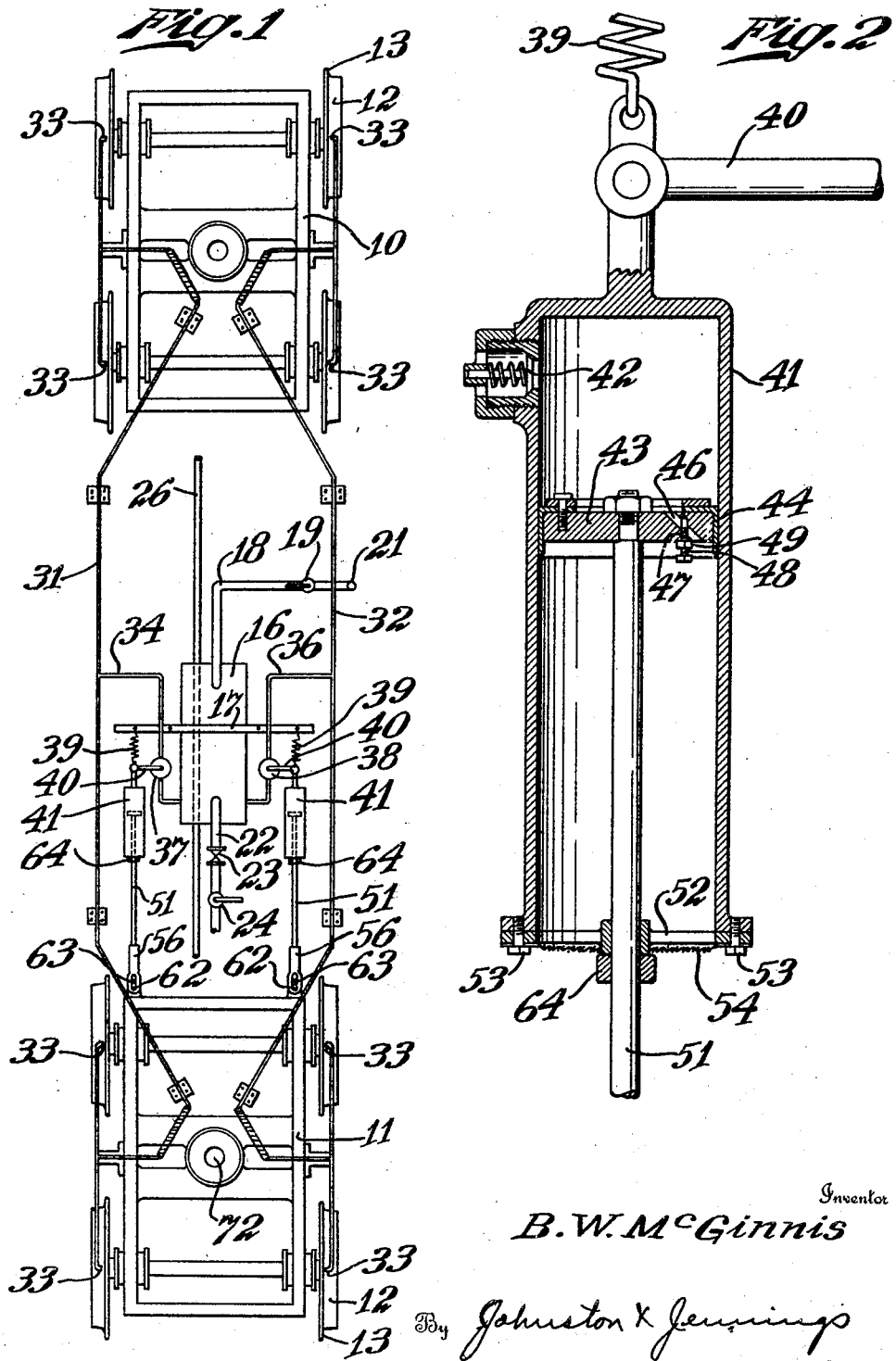

1,823,157

UNITED STATES PATENT OFFICE

BASIL W. McGINNIS, OF BIRMINGHAM, ALABAMA

FLANGE LUBRICATOR

Application filed January 27, 1928. Serial No. 249,992.

My invention relates to flange lubricators for railway vehicles and has for its object the provision of apparatus of the character designated which shall be simple of design, economical of manufacture, and reliable in operation.

Another object of my invention is to provide a flange lubricator operable by relative movement between the vehicle body and its truck, and which shall include readily adjustable means to adapt the lubricator to a wide range of operating conditions.

A further object of my invention is to provide a flange lubricator, operable by relative movement between the railway vehicle and its truck, and which shall include adjustable means for regulating the duration of operation of the lubricator upon relative movement between the vehicle and the truck.

A still further object of my invention is to provide a flange lubricator operable by relative movement between the vehicle and its trucks and which shall include pneumatic cushion means controlling the operation of the device upon relative movement of the vehicle and its trucks.

As is well known in the art to which my invention relates, the flanges on the wheels of railway vehicles are subject to continuous wear, especially when rounding curves. Among other things, this wear is dependent on the degree of curvature of the track and the speed of the vehicle. It is also well known that when flanges become worn a given maximum amount, it is necessary to remove the wheels from the vehicle and replace them or, in the case of locomotive wheels, to remove the tires from the wheels and replace them with tires having unworn flanges. In order to increase the time interval between the changes of wheels or tires, various devices for oiling the flanges of railway vehicle wheels have been provided.

These devices may be roughly divided into two general groups, namely, devices operated by steam or air pressure and which deliver a regulable amount of lubricant to the flanges at all times, and devices operated in response to relative movement between vehicle parts in rounding curves and which deliver lubricant to the flanges only when rounding curves. It is this latter, general class of devices to which my invention belongs. In this class of apparatus, difficulties have been encountered in operation due to the fact that upon relative movement of the vehicle truck and the vehicle body, the lubricant supply is started and, with devices with which I am familiar, the lubricant is supplied continuously to the flanges until the truck and the vehicle body have again assumed their normal relative positions on straight track. Thus, if the vehicle happens to be standing on a curve for some length of time, the lubricant is supplied all the time the vehicle is so standing, thus entailing wastage of lubricant and rendering the rails slippery. Furthermore, upon slow motion of the vehicle around curves and on upgrades, an excess of lubricant is supplied to the flanges of the vehicle, wasting lubricant and rendering the rails slippery.

These and other difficulties are overcome by means of my invention and I provide a flange lubricator, simple of design and economical of manufacture and by means of which regulable amounts of lubricant are supplied to the flanges of the vehicle at the times when most needed. Briefly, my invention comprises a lubricant supply, means responsive to relative movement between the vehicle body and the truck for connecting the supply of lubricant to the vehicle flanges, and separable elements included in the last mentioned means which resist separating movement due to atmospheric pressure, when connecting the lubricant supply to the flanges, together with means for regulating the admission of air between the separable elements. Yielding means are also provided to limit the approach to each other of the separable elements so that the lubricant is only supplied to the flanges bearing against the outside rail of a curve. Thus, with my apparatus, when the railway vehicle is standing on a curve the lubricant supply to the flanges is automatically cut off and, when ascending grades slowly around curves, the apparatus may be regulated to supply a minimum or no lubricant to the flanges as the service may require.

Apparatus embodying features of my invention is illustrated in the accompanying drawings, wherein Fig. 1 is a plan view of my improved flange lubricator as applied to the trucks of a railway car;

Fig. 2 is a detail view of the valve actuating means employed with my improved apparatus, Fig. 3 is a plan view of my improved flange lubricator applied to a locomotive; and Fig. 4 is a detail view of a part of the operating mechanism.

Referring now to the drawings for a better understanding of my invention, I show a pair of truck bodies 10 and 11 which are illustrative of the trucks employed at the opposite ends of railway cars, each having wheels 12 provided with flanges 13. At 16 is shown a lubricant reservoir secured in any suitable manner to a frame element 17 of the vehicle body and filled with lubricant through a conduit 18 provided with a shut-off valve 19 and terminating to one side of the vehicle at 21. In order that the lubricant may be under pressure, an air conduit 22 is connected to the reservoir 16. The conduit 22 may be connected to the usual air line on the vehicle not shown, and is supplied with a non-return check valve 23 provided with a shut-off valve 24. At 26 is shown a steam conduit extending through the reservoir 16 and which may be utilized to maintain the lubricant at the proper temperature in cold weather.

On opposite sides of the vehicle truck are provided conduits 31 and 32 each provided with nozzles 33, which may be of any approved design, and which are directed toward the flanges 13 of the wheels 12. A branch conduit 34 conveys lubricant 16 to the conduit 31 and a branch conduit 36 conveys lubricant from the reservoir 16 to the branch conduit 32. A valve 37, which may be of any approved design, controls the flow of lubricant from the reservoir through the branch conduit 34 and a similar valve 38 controls the flow of lubricant from the reservoir to the branch conduit 36. Each of the valves 37 and 38 is provided with an operating handle 40. Connected to each of the operating handles 40 is a spring 39 having one end connected to the frame element 17 so as to bias the valves to a closed position.

Pivotally connected to each of the operating handles 40 is a cylinder 41, closed at the end adjacent the operating handle 40 and provided at said end with a spring biased outwardly opening check valve 42, Fig. 2. Within the cylinder 41 is a piston 43 provided with a suitable packing means, such as a cup leather 44, in order to make it fluid tight. Extending through the piston 43 is a passage 46 controlled by a valve 47 having a threaded stem 48 and held in adjusted position by means of a lock nut 49. Secured to the piston 43 is a rod 51 slidably supported in the end of the cylinder by means of a spider 52, the latter being secured to the cylinder by means of screws 53. The valve 47 may be adjusted to permit the desired restricted flow of air through the piston 43 by inserting a tool through the openings in the spider 52. In order that the interior of the cylinder 41 shall not become clogged with dirt and grit, and also to protect the passage 46, in the piston 43, the spider 52 is preferably covered with a screen 54. It will be obvious that the passage 46 and valve 47 might be otherwise located, but I prefer to locate it in the manner shown, in order that the passage may be better protected from clogging.

The opposite end of the rod 51 is slidably carried in a sleeve member 56, Fig. 4. The sleeve member 56 is provided with a slot 57 and a pin 58, passing through the rod 51, to limit the sliding movement of the rod 51 with respect to the sleeve 56. Within the hollow of the sleeve 56 is a compression spring 59 which normally holds the rod 51 in its extreme outward position with respect to the sleeve 56. The sleeve member 56 terminates in a flattened end 61 having an elongated slot 62 therein and is connected one on each side of the truck 11 by means of pins 63. While the place of connection is, in the instance shown, near the truck corners, this point will be determined by the maximum angular movement of the truck relative to the vehicle body. If the angular movement of the corners of the truck should be greater than the desired travel of the piston 43, then connection should be made at a point nearer the truck center. In order to limit inward movement of the piston 43 in the cylinder 41, a collar 64 is suitably secured to the rod 51. Upon angular movement of the truck 11 in a direction to force the rod 51 and piston 43 inwardly of the cylinder 41, the collar 64 arrests said movement and thereafter the spring 39 is compressed and the sleeve member 56 slides over the rod 51 to allow for such further movement of the truck. The collar 64, the rod 51, and the sleeve 56 are so disposed, that when the vehicle is on straight track, the collar 64 is resting against the spider 52 and the pin 58 is against the inner end of the slot 57, as seen in Fig. 4. The slotted opening 62 in the flattened end 61 of the sleeve 56 permits a limited amount of angular movement of the truck 11 without affecting the piston 43 or the valve to which the cylinder is connected.

From the foregoing description, the operation of the apparatus so far described will be apparent. When the vehicle to which the device is attached, is rounding a curve, for example, a curve to the right, as seen in Fig. 1, the truck 11 will swing in a clockwise direction around its center pin, indicated at 72, ahead of the turning movement of the vehicle body and its frame element 17. This relative angular motion between the truck and vehicle body exerts a pulling force on the rod 51, shown at the left hand side of the drawing, and a pushing force on the rod 51, shown at the right hand side of the drawing. The rod 51, at the right hand side of the drawing, is prevented from entering the right hand cylinder 41 by reason of the collar 64 and the spring 59 is compressed to allow the rod 51 to slide farther into the sleeve 56. At the same time, the rod 51 on the left hand side starts to pull the piston 43 outwardly away from the end of the cylinder 41, which separation of said parts is resisted by reason of atmospheric pressure. The pulling force exerted on the rod 51 is therefore transmitted to the operating handle 40 of the valve 37 and the valve 37 is opened, supplying lubricant through the branch conduit 34 and conduit 31 to the flanges 33 on the left hand side of the vehicle. If the vehicle should be standing on a curve, or slowly going round a curve, as has just been described, the restricted flow of air through the passage 46 permits the spring 39 to pull the cylinder 41 away from the piston 43 and the handle 40 in a direction to close the valve.

The duration of opening of the valves 37 and 38 may be adjusted to any time interval desired, for a given opening movement, by adjusting the valve 46. When the vehicle to which the device is attached again approaches straight track, the truck 11 swings back to its normal position and the rod 51 on the left hand side of the vehicle, moves the piston 43 inwardly of the cylinder 41, the air ahead of the piston escaping freely from the cylinder by way of the check valve 42. At the same time, the spring 39 pushes the rod 51, shown on the right hand side of the drawing, outwardly of the sleeve 56 to its normal position with the vehicle on straight track. The slots 62 in the ends of the sleeve members 56 permit a limited degree of relative movement between the truck 11 and the rods 51 without affecting the valves 37 and 38.

Should the vehicle go around a curve to the left, as seen in Fig. 1, the operation is the same as that just described, except that lubricant is supplied to the flanges 13 on the right hand side of the vehicle. The description of this operation therefore need not be repeated.

It will be seen that the duration of opening of the valves can be accurately regulated by means of the valve 47 controlling the flow of air through the passage 46. Furthermore, it will be obvious that the valve may be so regulated that upon slow movement, as upon upgrades around curves, air may be supplied at a sufficient rate to the cylinder 43 that the supply valves do not open at all. If desired, the valve 47 may be closed off entirely, assuring positive opening of the supply valves at whatever speeds upon rounding curves.

In Fig. 3, I have shown my invention as applied to a locomotive. The apparatus shown in this figure is the same as that previously described, the only difference being in its particular adaption to a locomotive. At 81 is shown an engine truck frame having four truck wheels 82 with flanges 83, the truck being capable of angular movement with respect to the rest of the locomotive around a centering pin 84. Locomotive drivers are shown at 86 and are provided with flanges 88. At 89 is shown the lubricant reservoir, which is similar in all respect to that shown in Figs. 1 and 2 and is secured in any suitable manner to a frame element 91 of the locomotive. Conduits 92 and 93 supply the lubricant to the flanges 83 and 88 on opposite ends of the locomotive, being themselves supplied with lubricant under pressure through branch conduits 94 and 96 respectively. The flow of lubricant through the branch conduits 94 and 96 is controlled by means of valves 97 and 98, similar in all respects to the valves 37 and 38 already described. The valves 97 and 98 are operated by means of rods 100 and 101 secured to opposite sides of the truck frame 81 and exerting an opening pull on the valves through cylinders 102 and 103, similar to the cylinder 41 already described.

From the foregoing it will be apparent that I have devised an improved flange lubricator for railway vehicles, simple of design and economical of manufacture and which is capable of delivering regulable amounts of lubricant to the flanges of a railway vehicle over a wide range of operating conditions.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a flange lubricator for railway vehicles, a lubricant reservoir, a valve to control the flow of lubricant from the reservoir to a flange to be lubricated, spring means for closing the valve, means responsive to relative movement of vehicle parts for opening the valve, separable elements included in the last mentioned means and resisting separation during the opening of the valve by reason of atmospheric pressure, and means permitting a restricted flow of air between the elements during separating movement.

2. In a flange oiler for a railway vehicle having a body and a truck movable with respect to the body, an oil reservoir mounted on the body, means for supplying air under pressure to the reservoir above the oil therein, conduit means leading from the oil reservoir to the flanges to be lubricated, a valve controlling the flow of oil through the conduit means, means for biasing the valve to a normally closed position, means responsive to movement of the truck with respect to the body in one direction to open the valve means, and means limiting the duration of opening of the valve means upon movement of the truck.

3. In a flange lubricator for a railway vehicle having a body and a truck angularly movable with respect to the body, a lubricant reservoir, means for maintaining lubricant under pressure within the reservoir, conduit means connecting the reservoir with the flanges to be lubricated, valve means controlling the flow of lubricant through the conduit means, means for biasing the valve means to a normally closed position, means connecting the body of the truck with the valve means to operate said valve means in response to angular movement of said truck with respect to the body, and pneumatic cushioning means interposed in the connecting means to limit the duration of opening of the valve means.

4. In a flange lubricator for a railway vehicle having a body and a truck movable with respect to the body, a lubricant reservoir, means for maintaining lubricant under pressure within the reservoir, conduit means connecting the reservoir with the flanges to be lubricated, valve means controlling the flow of lubricant through the conduit means, means for biasing the valve means to a normally closed position, a cylinder operatively connected to the valve means, a piston in the cylinder, means connecting the piston to the vehicle truck, and means permitting free movement of the piston in the cylinder in a direction to close the valve means and impeded movement in a direction to open the valve means.

5. In a flange lubricator for a railway vehicle having a body and a truck rotatable with respect to the body, a lubricant reservoir, means for maintaining lubricant under pressure within the reservoir, conduit means connecting the reservoir with the flanges to be lubricated, valve means controlling the flow of lubricant through the conduit means, means for biasing the valve means to a normally closed position, a cylinder operatively connected to the valve means, a check valve in the cylinder permitting an outflow of air from the end adjacent the valve means, a piston in the cylinder and connected for movement by the vehicle truck, and means permitting restricted flow of air into the cylinder upon movement of the piston in a direction away from the cylinder head.

6. In a flange lubricator for a railway vehicle having a body and a truck capable of relative angular movement with respect to the body, a lubricant reservoir, means for maintaining lubricant under pressure within the reservoir, conduit means connecting the reservoir with the flanges to be lubricated, valve means controlling the flow of lubricant through the conduit means, means for biasing the valve means to a normally closed position, a cylinder operatively connected to the valve means, a check valve in the cylinder permitting an outflow of air from the end adjacent the valve means, a piston in the cylinder connected to one side of the vehicle truck, and regulable means permitting a restricted flow of air into the cylinder upon movement of the piston in a direction to open the valve means.

7. In a flange lubricator for a railway vehicle having a body and a truck capable of angular movement with respect to the body on rounding curves, a lubricant reservoir carried by the body, conduit means connecting the reservoir with the flanges to be lubricated, a valve controlling the flow of lubricant through the conduit means to the flanges on each side of the vehicle, a spring for normally holding each of the valves in closed position, means connecting opposite sides of the truck to the respective valves, and pneumatic cushion means interposed in the last mentioned means for controlling the movement transmitted from the truck to the valves.

8. In a flange lubricator for a railway vehicle having a body and a truck capable of relative angular movement with respect to the body, a lubricant reservoir, means for maintaining lubricant under pressure within the reservoir, conduit means connecting the reservoir with the flanges to be lubricated, valve means controlling the flow of lubricant through the conduit means, means for biasing the valve means to a normally closed position, a cylinder operatively connected to the valve means, a check valve in the cylinder permitting an outflow of air from the end adjacent the valve means, a piston in the cylinder connected to one side of the vehicle truck, a regulable means permitting a restricted flow of air into the cylinder upon movement of the piston in a direction to open the valve means, means for arresting movement of the piston inwardly of the cylinder beyond its normal position when on straight track, and yieldable means interposed in the connection between the piston and the truck to allow for movement of the truck in a direction to force the piston further inward of the cylinder.

9. In a flange oiler for a railway vehicle having a body and a truck movable with respect to the body, a valve controlling the flow of lubricant to the flanges to be lubricated, means responsive to relative movement between the truck and the body for opening the valve means for biasing the valve towards a closed position, and dash pot means for limiting the duration of opening of the valve.

10. In a flange oiler for a railway vehicle having a body and a truck movable with respect to the body, a valve controlling the flow of lubricant to the flanges to be lubricated, means responsive to relative movement between the truck and the body for opening the valve, dash pot means included in the last mentioned means which yieldingly resist separation during the opening of the valve, and means for biasing the valve toward a closed position.

In testimony whereof I, BASIL W. McGINNIS, affix my signature.

BASIL W. McGINNIS.